United States Patent
Griffin et al.

(10) Patent No.: US 8,839,345 B2
(45) Date of Patent: Sep. 16, 2014

(54) METHOD FOR DISCOVERING A SECURITY POLICY

(75) Inventors: John L. Griffin, Arlington, VA (US); Dimitrios Pendarakis, Westport, CT (US); Ronald Perez, Austin, TX (US); Reiner Sailer, Scarsdale, NY (US); Enriquillo Valdez, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 12/049,629

(22) Filed: Mar. 17, 2008

(65) Prior Publication Data

US 2009/0235324 A1 Sep. 17, 2009

(51) Int. Cl.
*H04L 21/00* (2006.01)
*H04L 29/06* (2006.01)
*H04L 29/08* (2006.01)
*G06F 21/62* (2013.01)
*H04W 12/08* (2009.01)

(52) U.S. Cl.
CPC ............... *H04L 63/20* (2013.01); *H04L 67/10* (2013.01); *H04L 67/00* (2013.01); *G06F 21/629* (2013.01); *H04W 12/08* (2013.01)
USPC .............................................. 726/1; 709/223

(58) Field of Classification Search
CPC ......... H04L 63/20; H04L 67/00; H04L 67/10; G06F 21/629; H04W 12/08
USPC ........................................................... 726/1
See application file for complete search history.

(56) References Cited

U.S. PATENT DOCUMENTS

| | | | |
|---|---|---|---|
| 7,016,980 B1 | 3/2006 | Mayer et al. | |
| 7,185,367 B2 | 2/2007 | Munson | |
| 7,284,267 B1 * | 10/2007 | McArdle et al. | 726/11 |
| 7,533,414 B1 * | 5/2009 | Reed et al. | 726/22 |
| 7,685,261 B1 * | 3/2010 | Marinelli et al. | 709/220 |
| 7,849,497 B1 * | 12/2010 | Hurst et al. | 726/1 |
| 2001/0042213 A1 * | 11/2001 | Jemes et al. | 713/201 |
| 2001/0049793 A1 * | 12/2001 | Sugimoto | 713/200 |
| 2002/0184520 A1 * | 12/2002 | Bush et al. | 713/200 |
| 2004/0098610 A1 | 5/2004 | Hrastar | |
| 2005/0251860 A1 * | 11/2005 | Saurabh et al. | 726/23 |
| 2005/0273841 A1 | 12/2005 | Freund | |
| 2006/0206935 A1 | 9/2006 | Choi et al. | |
| 2006/0236373 A1 | 10/2006 | Graves et al. | |

OTHER PUBLICATIONS

AppArmor Application Security for Linux., www.novell.com/linux/security/apparmor., printed: Jun. 13, 2008.
P. Karger. Limiting the Damage Potential of Discretionary Trojan Horses. In Proc. IEEE Symposium on Security and Privacy, 1987.

(Continued)

*Primary Examiner* — Lisa Lewis
(74) *Attorney, Agent, or Firm* — Ryan, Mason & Lewis, LLP (57) ABSTRACT

Techniques for mapping at least one physical system and at least one virtual system into at least two separate execution environments are provided. The techniques include discovering an implicitly enforced security policy in an environment comprising at least one physical system and at least one virtual system, using the discovered policy to create an enforceable isolation policy, and using the isolation policy to map the at least one physical system and at least one virtual system into at least two separate execution environments. Techniques are also provided for generating a database of one or more isolation policies.

25 Claims, 4 Drawing Sheets

(56) References Cited

OTHER PUBLICATIONS

Security-Enhanced Linux. http://www.nsa.gov/selinux., printed: Jun. 13, 2008.

Schlegelmilch et al. Role Mining with ORCA. In ACM Symposium on Access Control Models and Technologies, Jun. 2005.

R. E. Tarjan. Depth First Search and Linear Graph Algorithms. SIAM J. Comput. 1, 146-160, 1972.

Vaidya et al. The Role Mining Problem: Finding a Minimal Descriptive Set of Roles in ACM Symposium on Access Control Models and Technologies, Jun. 2007.

Zhang, et al., Role Engineering Using Graph Optimisation. In ACM Symposium on Access Control Models and Technologies, Jun. 2007.

* cited by examiner

STEPS 1-2

STEP 3
DOM_LIST1: C1, W, AS1, DB, AS2, AS3
DOM_LIST2: C2, W, AS2, DB, AS1, AS3
DOM_LIST3: C3, W, AS3, DB, AS1, AS2

STEP 4
DOM_LIST1: C1, W, AS1, DB, ~~AS2~~, ~~AS3~~
DOM_LIST2: C2, W, AS2, DB, ~~AS1~~, ~~AS3~~
DOM_LIST3: C3, W, AS3, DB, ~~AS1~~, ~~AS2~~

STEP 5
W, DB

METHOD FOR DISCOVERING A SECURITY POLICY

FIELD OF THE INVENTION

The present invention generally relates to information technology, and, more particularly, to security policies and workload discovery and isolation.

BACKGROUND OF THE INVENTION

Challenges exist in determining what security policy is actually being enforced by computer systems. In computer systems where multiple applications are run on behalf of independent entities, the possibility exists for an application to influence or be influenced by another application. As used herein, "computer systems" refer to an environment of one or more physical machines, each running zero or more virtual machines. The physical and virtual machines may be, for example, heterogeneous in the hardware and software installed therein, and may be, for example, physically collocated or managed by the same administrative entity.

As used here, "entities" refer to users and/or organizations and/or administrators who cause one or more independent applications to be executed on one or more of the computer systems. These applications may execute simultaneously, their executions may overlap for one or more periods of time, or their executions may be mutually exclusive. Also, as used herein, "influence" refers to information concerning or describing the application's execution (for example, program source code, instructions or data stored in caches, memory, disks, tapes, optical, network or other storage devices, as well as information transmitted to or received from input/output (I/O) devices such as monitors, human input devices, wired and wireless network devices) and its environment (for example, application, operating system, virtual machine, and/or hardware scheduling algorithms, static or dynamic allocations to the application of system resources such as processing time on the main or peripheral processors, space on memory or storage devices such as those mentioned above, and/or energy consumed during the application's execution) that can be accessed by another application, modified by another application, or both accessed and modified by another application.

Sometimes this sharing of information is desirable from the point of view of the entities involved. For example, information flowing from one application to another is a natural part of distributed application design. An administrator may wish to specify that an application is to receive a "best-effort" allocation of resources after all other applications have consumed what they need.

However, sometimes this sharing of information is not desirable. For example, the information flowing from one application to another may contain a patient's personal medical information (that is, information considered sensitive by one or more of the entities). Therefore, for ethical and legal compliance reasons, the entity desires for that information not to be made accessible or modifiable by an unauthorized third application.

The concept of a security policy can be, for example, that in which a computer system enforces restrictions and/or permissions concerning how one system component may influence or be influenced by another system component. The security policy can describe how the computer system moderates access to the resources shared by the components (both shared within a single computer system and shared across multiple systems), and moderates access to any data contained by those resources in order to meet the entities' goals for protecting the components.

Existing approaches for security policy determination are specification-oriented, in that the policy is determined by querying the system about its currently configured state, or obtaining from the entities the security policy specifications they earlier provided to the computer system. An example of specification-oriented security policy determination is using the "exportfs" command to obtain a list of the exported local file systems under the Network File System (NFS) service.

Problems such as, for example, security policy composition and security policy verification, exist with specification-oriented security policy determination. The problem of security policy composition includes the initial synthesis of an expressive security policy. It is difficult and labor-intensive for an entity to create a security policy customized for its application's unique environment. Existing approaches include starting with a default policy and having the entity manually modify this policy to fit its expected application environment. This default security policy can be all-exclusive, all-inclusive, or statically pre-configured based on an expert or external analysis of another entity's application or installation. An example of the latter is a default rule set tuned to a specific operating system with installs that have been made available for the Tripwire intrusion detection tool.

Such an approach (that is, a best practice) is suboptimal because no provision is made for bootstrapping. The entity starts with no feedback from the computer system regarding its existing, working, productive security configuration, a state from which the current well-grounded de facto security policy can be analyzed, verified, and tweaked or extended as needed for minimal disruption to the working system.

The problem of security policy verification includes mechanisms for auditing the computer system to determine the degree to which its behavior adheres to the security policy that was specified by the entities. Existing approaches do not include a behavior-based analysis toolkit for independently verifying the interlock between a security policy specification and the running system, or for iteratively developing and deploying a security policy based on the observed effects of various alternative configurations. This is suboptimal as it may allow for incorrect or misunderstood implementations of security policy enforcement mechanisms.

Existing approaches include, for example, U.S. Pat. No. 7,016,980 entitled "Method and Apparatus for Analyzing One or More Firewalls," which includes analyzing the operation of one or more network gateways, such as firewalls or routers that perform a packet filtering function in a network environment. However, this approach provides an incomplete solution to the security policy discovery problem.

Existing approaches also include, for example, U.S. Published Application No. US 20060206935 entitled "Apparatus and Method for Adaptively Preventing Attacks," which includes adaptively preventing attacks which can reduce false positives and negatives for abnormal traffic and can adaptively deal with unknown attacks.

Additionally, existing approaches include, for example, U.S. Pat. No. 7,185,367 entitled "Method and system for establishing normal software system behavior and departures from normal behavior," which includes detecting abnormal activity of a software system based on behavioral information obtained from an instrumented computer program while it executes.

SUMMARY OF THE INVENTION

Principles of the present invention provide techniques for discovering a security policy. An exemplary method (which may be computer-implemented) for mapping at least one physical system and at least one virtual system into at least two separate execution environments, according to one aspect of the invention, can include steps of discovering an implicitly enforced security policy in an environment comprising at least one physical system and at least one virtual system, using the discovered policy to create an enforceable isolation policy, and using the isolation policy to map the at least one physical system and at least one virtual system into at least two separate execution environments.

In an embodiment of the invention, an exemplary method for generating a database of one or more isolation policies includes the following steps. An implicitly enforced security policy is discovered in an environment comprising at least one physical system and at least one virtual system. The discovered policy is used to create an enforceable isolation policy. The isolation policy is used to map the at least one physical system and at least one virtual system into at least two separate execution environments. Also, each isolation policy is stored in a searchable database.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include determining what security policy is actually being enforced by a computer system. Additionally, principles of the invention also include helping individuals identify security deficiencies in new or existing installations, as well as helping individuals migrate to new products that incorporate technologies unfamiliar thereto. Also, in contrast to the disadvantageous existing approaches noted above, one or more embodiments of the present invention generate an isolation policy that separates virtual and physical systems according to their running workloads. The workloads can be discovered, for example, by employing systems' static and dynamic information.

As detailed above, the existing approaches are suboptimal. In contrast, principles of the present invention provide a holistic approach to security policy discovery on physical and virtualized systems. One or more embodiments of the invention examine an entire software stack running on systems, the network layer, and the interaction among physical systems and virtual machines. The processes or software applications that enable communication and/or sharing between systems are determined. Tools such as, for example, the Integrity Management Architecture (IMA), can be employed to determine the identities of applications that export services to other systems via the network.

Also, application (for example, http server) configuration and log files can be analyzed to reason about the services provided by a system. Additionally, it can be determined if systems enforce security policies such as, for example, SELinux, AppArmor, and/or sHype. One or more embodiments of the invention also examine the network layer, and can determine if systems are logically separated on the network via Virtual LANs (VLANs). For a virtualized environment, one or more embodiments of the present invention can examine the interaction between virtual machines running on the same local system or on different systems.

As described herein, principles of the present invention include, for example, discovering the implicitly enforced security policy and generating an enforceable isolation policy from the discovered policy. Also, the isolation policy can map physical and virtualized systems into isolated, separate execution environments.

One or more embodiments of the invention also process configuration files and system run-time information to discover the implicitly enforced security. After the discovery process, a model of the network topology can be created based on the discovered security policy. Such a model can be used, for example, to partition virtual machines and systems into groups working on a common workload. Additionally, one or more embodiments of the invention can generate a security policy that ensures the isolation of different workload groups.

In contrast to the disadvantageous existing approaches, one or more embodiments of the present invention consider the services being offered on systems and their usage, and determine the behavior pattern of a workload (not of users) that is distributed on a set of virtual machines and/or systems. Further, principles of the present invention include detecting system, network, and storage configurations and mapping them onto a formalized rule set that restricts program behavior by mandatory access controls rather than trying to analyze programs and detect anomaly behavior. As described herein, one or more embodiments of the invention include a representation of sharing between programs that is independent of the program (that is, determined by program-external configuration) and independent of the program user behavior.

Also, principles of the invention include an observation-oriented approach to security policy determination, as an alternative to (or as a complementary approach to) the specification-oriented approach described above. The behavior of an existing system can be analyzed in situ, and the results of that analysis can be used to synthesize a default security policy that is descriptive of the current behavior of the system. Such a default security policy can be, for example, further analyzed and modified to meet the entities' requirements for component protection.

One or more embodiments of the invention provide advantages such as, for example, addressing the problems that are inherent to specification-oriented security policy determination. As detailed herein, policy statements can be provided that are grounded in the real behavior of a system and its components. The policy discovery process can be, for example, initiated multiple times while the system is under various combinations of applications, workloads, configurations, and external stimulus, and at different times before and after a system is deployed. Furthermore, one or more embodiments of the invention provide immediate feedback on the actual behavioral effect of a change in the installed security policy.

Principles of the present invention include observing a computer system in operation. Specifically, the way in which the individual system components interact with any shared resources is monitored, as well as the way in which these components access or modify any data contained by the shared resources. These interactions can also be correlated with the workloads present in the computer system, as well as with any external inputs or stimuli that are applied to the system.

Analysis of such monitoring provides, for example, clear lines where de facto policy boundaries can be drawn. For example, if two system components use a shared network to communicate only between themselves, a policy boundary can be provided that encompasses those two components and the network. Beyond this, the analysis can also provide "fuzzy" boundaries that represent a system's inability to synthesize a clear policy across multiple workloads or configurations. For example, if one of tile above components also communicated with a third component across a second shared network, one or more embodiments of the invention can provide probabilistic boundaries along with helpful advice or commentary, such that the security policy officer could make an ultimate determination of policy.

The policy that is produced by such an analysis can be entirely synthesized by the analysis engine, or it can be the result of performing a best-fit analysis of known good policies with the behavior of the workload, or both. Specific policies that can be applicable to one or more embodiments of the invention include, for example, simple type enforcement (STE) sharing, Chinese Wall, Biba or LaPadula multi-level security (MLS), Clark-Wilson or CW-Lite, and role-based access control.

Additionally, one or more embodiments of the present invention can be implemented by inserting software or hardware components into a computer system. These components can, for example, behave passively, measuring the actual interactions among system components, or they could behave actively, injecting artificial stimuli into the system, or both. One or more embodiments of the invention can also make use of existing measurement points already present inside or outside the system.

An illustrative embodiment of the present invention can include, for example, installing monitoring software or hardware, monitoring access to shared resources such as direct communication between entities, mapping it to a generic policy (either through synthesis or best-fitting as described above), minimizing the policy to ensure the maximum/most crisp coverage, interacting with a user or administrator to answer a question such as, for example, "Is this what you want?" and iterating accordingly.

In the context of virtual machines for program execution, one or more embodiments of the invention can provide a record of the current behavior by examining an existing system that includes real and virtual components, and distilling its behavior into a quantitative description such as, for example, an extensible markup language (XML) file. Also, one or more embodiments of the invention can provide a virtual environment that most closely approximates the original physical environment, which can be useful, for example, when an application migrates from a physical machine into a similarly-configured virtual machine.

As described herein, principles of the present invention include generating an explicit, customizable isolation policy based on currently enforced access restrictions and privileges and user feedback, as well as mapping largely independent systems into separate execution environments according to the isolation policy.

Computing systems can be vulnerable to each other when systems serving different workloads that are not properly isolated. Erroneous or inappropriate configurations of systems can allow the corruption or the failure of a single system to severely impact different workloads. For example, a virus effecting one workload can spread to another workload or a system servicing different workloads and cause a crash.

Principles of the present invention include a mechanism that isolates and minimizes systems servicing different workloads. The mechanism can discover the implicitly enforced security policy and generate an enforceable isolation policy from the discovered policy. The isolation policy can be, for example, a "white list" that explicitly defines all of the allowable accesses among physical and virtual systems of an environment.

As noted above and described herein, principles of the present invention employ an observation-oriented approach to determine the security policy of interconnected computer systems. Computer systems are physical machines that can run zero or more virtual machines, and/or run applications on behalf of users. A security policy is the set of permissions and/or restrictions enforced by the computer system (for example, network and/or disk access). Also, an observation-oriented approach can monitor interaction of computer system components and/or inject artificial stimuli, and include network communication, access to shared resources, etc.

One or more embodiments of the invention include a verification mechanism, wherein users can check if the discovered policy meets their expected security objectives. Additionally, one or more embodiments of the invention include generating an isolation policy to enforce explicitly the discovered security policy. The isolation policy minimizes and partitions systems to use only the privileges and/or services necessary to complete their tasks. Users can interact with the mechanism to refine the isolation policy to meet their desired security objectives.

Further, one or more embodiments of the invention include physical to virtual translation, wherein the discovery of the currently enforced security policy and the generated isolation policy facilitate the mapping of the current environment to a virtualized environment.

As described herein, a quantitative description (for example, an xml file) of a current system security policy is provided. Application can include, for example, composition, including analysis and modification of the security policy to meet user requirements (composition), verification, including checking that current computer system behavior/state adheres to specified security policy, and physical-to-virtual translator (for example, configuring virtual machines).

In an exemplary embodiment, a mechanism requires agents to run on physical and virtual systems and a central processing site. The agents collect dynamic information about inter-system and inter-virtual machine (-VM) communication and sharing. The agents can also monitor network communication, examine log and configuration files, invoke system commands to determine the running state, and use the Integrity Measurement Architecture (IMA) to identify loaded executables. After running a period of time, the agents can report system configuration information and observation to the central site for analysis.

At the central site, the reported information can be analyzed and the current security policy can be computed. The central site can also generate an isolation policy that permits the observed system interaction and partitions and minimizes systems serving different workloads.

Additionally, one or more embodiments of the present invention include an isolated domain algorithm, wherein a mechanism can be used, for example, to identify and isolate systems that serve different workloads. For example, in the simplest case, a system that provides non-shared services to different workloads can be partitioned into systems that provide services to a single workload only. Similarly, in cases where a system provides services that are shared and replicable, the system can also be partitioned into systems serving only a single workload. The worst case, for example, can be when a system runs shared, non-replicable services. In this case, the system cannot be partitioned, but one must trust the system to maintain separate and isolated information of the different workloads.

In addition to partitioning systems, one or more embodiments of the invention apply the principle of least privilege to minimize systems. That is, systems are given the least set of privileges to complete their tasks. This principle can be extended, for example, to include resources and services as well. One or more embodiments of the present invention discover un-utilized services offered by systems (and configures their removal from systems), as well as filter a system to run a minimized software stack. A partitioned system only runs the software that it needs to provide its services.

Isolated domains are grouping of systems that run different workloads. An algorithm for isolating domains can perform a number of tasks. For example, such an algorithm can determine the set of utilized services (US) on each system. The US set equals the intersection of the set of running services and the set of used services on a system by other systems. Any detected anomalies (for example, spoofing) will be reported to the user. User feedback is employed to customize the US set by adding and/or deleting services that are needed and/or un-utilized on systems.

An algorithm for isolating domains can also, for example, construct a dependency graph G(V,E) using the US set. As such, G(V,E) is a directed graph where each vertex in G represents a physical or virtual system. One can add a directed edge between vertex $v_j$ and $v_k$ if $v_j$ uses a service provided by $v_k$. This assumes a client-server model where a client $v_j$ requests a service provided by a server $v_k$. Note that a single edge between $v_j$ and $v_k$ can represent multiple services used by $v_j$ on $v_k$. The isolated domains are subsets of vertices that are isolated from each other. That is, there exists no path connecting the different subsets.

Additionally, an algorithm for isolating domains can, for example, find different domain lists using a depth first search (dfs). Domain lists are subsets of vertices that are reachable from a starting vertex (one that has no incoming edges). Also, such an algorithm can use the observed access pattern of systems to remove vertices from the domain lists that are not reachable during an actual execution from a starting vertex.

An algorithm for isolating domains can also, for example, identify the candidate vertices which are members of multiple domain lists. Depending on the type of services provided, these vertices can be processed to isolate the domain lists. Such an algorithm can also examine the services $[s_1 \ldots s_n]$ that the candidate vertices provide to the vertices of the domain lists. For example, for each domain list where the candidate vertex $v_i$ exists, an algorithm can derive a new system, $v'_k$, to run shared, replicable services and/or services that are not shared between different domain lists. Also, the domain list can be updated, wherein the references are changed from $v_i$ to $v'_k$. Additionally, the algorithm does not process candidate vertices that run shared, non-replicable services. These candidate vertices represent systems that are trusted with processing requests from different workloads.

The list of isolated domains includes the isolated policy. The list of isolated domains can be used, for example, to generate explicit configuration profiles for each system. This can include, for example, configuring only the utilized services on systems, updating application configuration files, replicating systems (determined in Step 6, as described below in connection with FIG. 3), partitioning systems to run as guard systems (determined in Step 6, as described below in connection with FIG. 3), placing a domain list on a separate VLAN or subnet, configuring firewall rules, configuring Ethernet switches, router, virtual private network (VPN), gateways, etc. and establishing secure tunnels.

Figure 1:
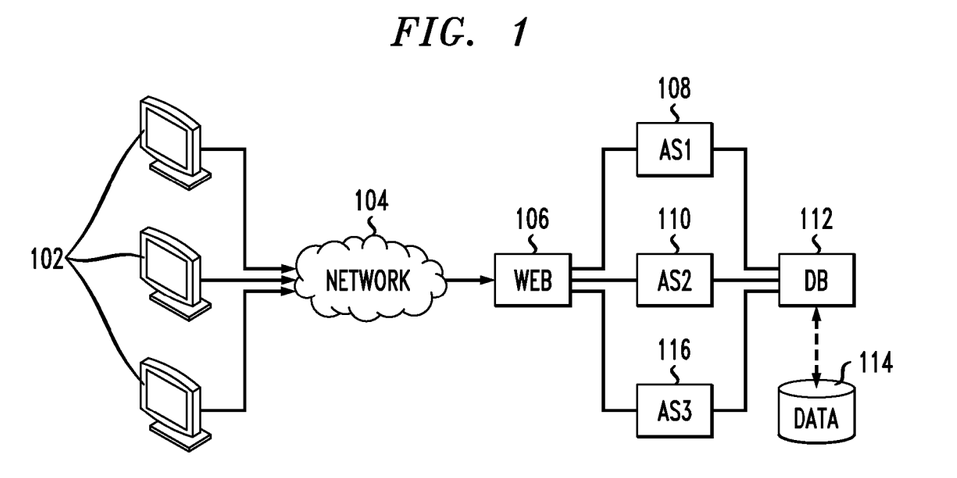
FIG. 1 is a diagram illustrating a multi-tiered web application, according to an embodiment of the present invention.

As depicted in FIG. 1, an isolated domain algorithm can be applied to a multi-tiered web application. By way of illustration, FIG. 1 depicts a first tier that includes a web server 106. Also, the second tier includes application servers (ASs) 108, 110 and 116, and the final tier consists of a high-performance backend database server 112. The request-response flow of the web application depicted in FIG. 1 is as follows. A client's request goes to the web server (for example, 106) which routes the request to the appropriate application server (for example, 108, 110 or 116). Providing the enterprise logic, the application server processes the client request using data 114 retrieved from the database server (for example, 112). After processing the request, the application server returns a response to the web server. The web server can forward the response to the client. In this example, the application servers can provide distinct services. For example, the web server can be stateless and the database server can provide access to shared, non-replicable data.

Element 102 represents customers that invoke the services of the multi-tiered web application. When a customer submits a request, this triggers discovery mechanisms that observe the run-time behavior of the web application (for example, what service is being invoked, which computer systems are involved in processing the request, etc.). Element 104 represents the network that connects customers to the web application's front end.

Figure 2:
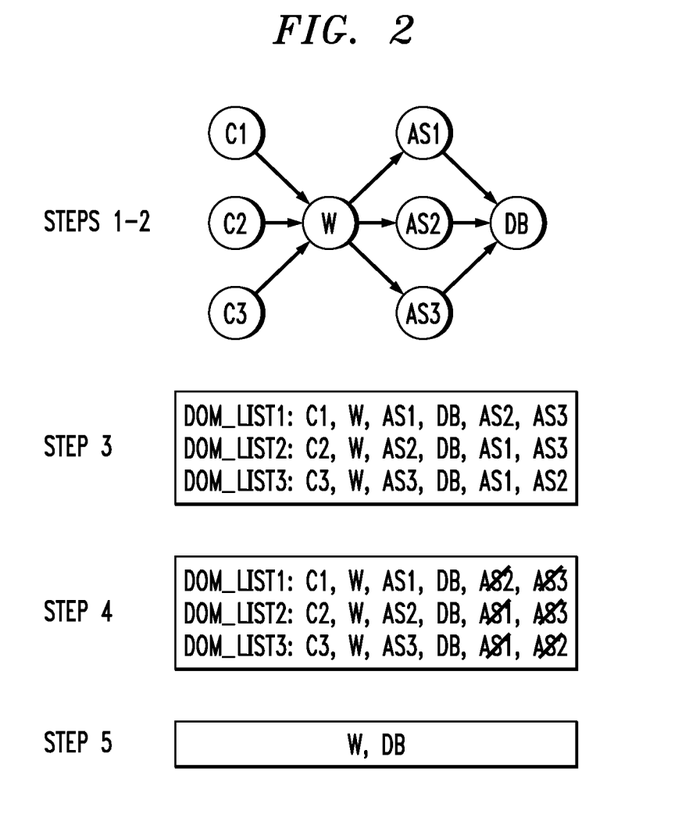
FIG. 2 is a diagram illustrating processing steps 1-5, according to an embodiment of the present invention.
Figure 3:
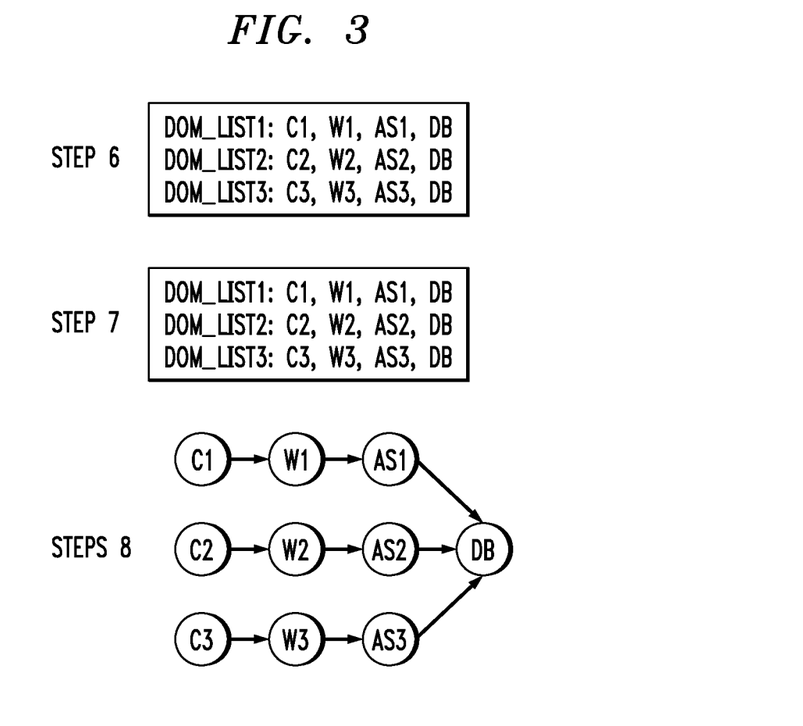
FIG. 3 is a diagram illustrating processing steps 6-8, according to an embodiment of the present invention.

FIG. 2 and FIG. 3 depict the processing steps of the isolated domain algorithm. FIG. 2 is a diagram illustrating processing steps 1-5, according to an embodiment of the present invention. FIG. 3 is a diagram illustrating processing steps 6-8, according to an embodiment of the present invention.

As depicted in FIG. 2, in steps 1 and 2 a graph model of the environment is constructed based on observing and analyzing system interaction. In step 3, three domain lists are discovered by applying the modified dfs on the graph model. In step 4, un-utilized systems are removed from the domain lists. These systems are reachable from a starting system (for example, client systems C1, C2, and C3), but are not involved in processing a request. Also, in step 5, the web server and database systems are candidates for isolation because they are members of multiple domain lists.

As depicted in FIG. 3, in step 6, because the web server is stateless, its services are replicable. Hence, new web servers are provided for the different client requests. However, the database server provides a non-replicable service, and therefore it cannot be replicated or partitioned. The database server provides data to application servers (AS1, AS2 and AS3). In step 7, the database server is labeled as trusted. Also, in step 8, a graph model is constructed of the isolated multi-tiered web application.

Figure 4:
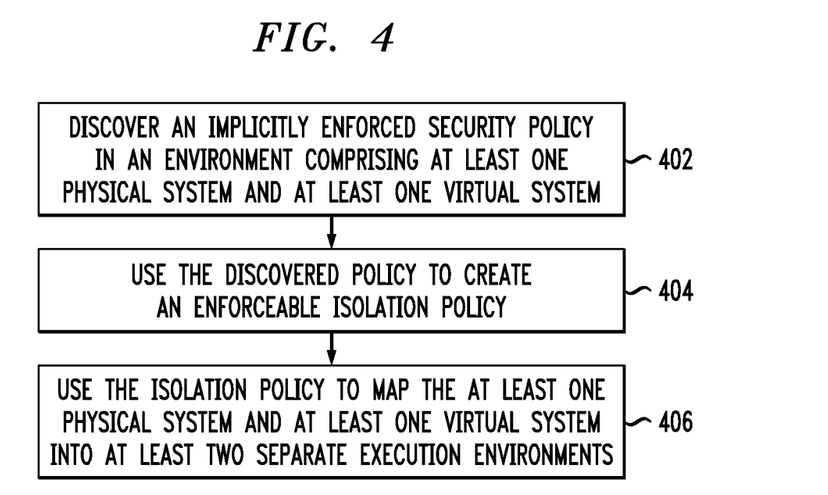
FIG. 4 is a flow diagram illustrating techniques for mapping at least one physical system and at least one virtual system into at least two separate execution environments, according to an embodiment of the present invention.

FIG. 4 is a flow diagram illustrating techniques for mapping at least one physical system and at least one virtual system into at least two separate execution environments, according to an embodiment of the present invention. Step 402 includes discovering an implicitly enforced security policy in an environment that includes at least one physical system and at least one virtual system. Discovering an implicitly enforced security policy can include processing configuration files and/or system run-time information. Also, discovering an implicitly enforced security policy can include considering services being offered on a system and usage of the services, as well as determining a behavior pattern of a workload that is distributed on a set of virtual machines and/or physical systems.

Step 404 includes using the discovered policy to create an enforceable isolation policy. The isolation policy can separate different workloads running in an environment. The isolation policy can include, for example, a white list that explicitly defines all allowable accesses among physical and virtual systems of an environment. Using the discovered policy to create an enforceable isolation policy can include creating a model of a workload network topology based on the discovered policy. The workload network topology model can be used, for example, to partition virtual machines and/or physical systems into groups working on a common workload.

Also, in using the discovered policy to create an enforceable isolation policy, the policy can be synthesized via an analysis engine and/or performing a best-fit analysis of known good policies with analogous behavior. Further, using the discovered policy to create an enforceable isolation policy can include providing system configuration information and observation to a central site for analysis, wherein the central site computes a current security policy. Additionally, one or more embodiments of the invention can operate in an agent-less model where a central site can log onto the sites and retrieve information.

Step 406 includes using the isolation policy to map the at least one physical system and at least one virtual system into at least two separate execution environments. Also, as described herein, a security policy specifies the rules that govern access to resources by workloads (that is, applications) running on computer systems. These rules can be determined explicitly, for example, from application configuration files or implicitly inferred from workload network communication patterns. An isolation policy is derived from the discovery security policy and specifies (explicitly) rules for separating workloads running on multiple computer systems.

Additionally, the techniques depicted in FIG. 4 can also include providing feedback on a behavioral effect of a change in security policy, as well as using a verification mechanism to enable a user to check if the discovered policy meets expected security objectives. One or more embodiments of the invention can also include enabling a user to refine the isolation policy to meet desired security objectives.

The techniques depicted in FIG. 4 can additionally include, for example, using an isolated domain algorithm to identify and isolate systems that serve different workloads, determine a set of utilized services (US) on each system, construct a dependency graph G(V,E) using a US set, find different domain lists using a depth first search (dfs), remove vertices from a domain list that are not reachable during an execution from a starting vertex via use of an observed access pattern of systems, and detect vertices which are members of multiple domain lists. Also, one or more services of the one or more shared vertices can be examined to confine the multiple domain lists.

Figure 5:
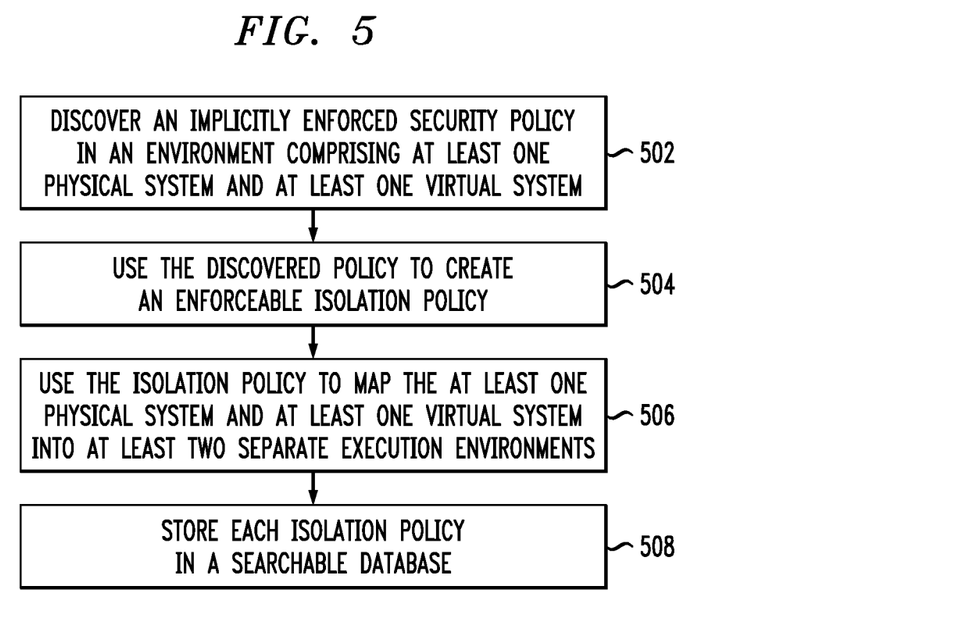
FIG. 5 is a flow diagram illustrating techniques for generating a database of one or more isolation policies, according to an embodiment of the present invention.

FIG. 5 is a flow diagram illustrating techniques for generating a database of one or more isolation policies, according to an embodiment of the present invention. Step 502 includes discovering an implicitly enforced security policy in an environment that includes at least one physical system and at least one virtual system. Step 504 includes using the discovered policy to create an enforceable isolation policy. The isolation policy can separate different workloads running in an environment. Step 506 includes using the isolation policy to map the at least one physical system and at least one virtual system into at least two separate execution environments. Step 508 includes storing each isolation policy in a searchable database.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
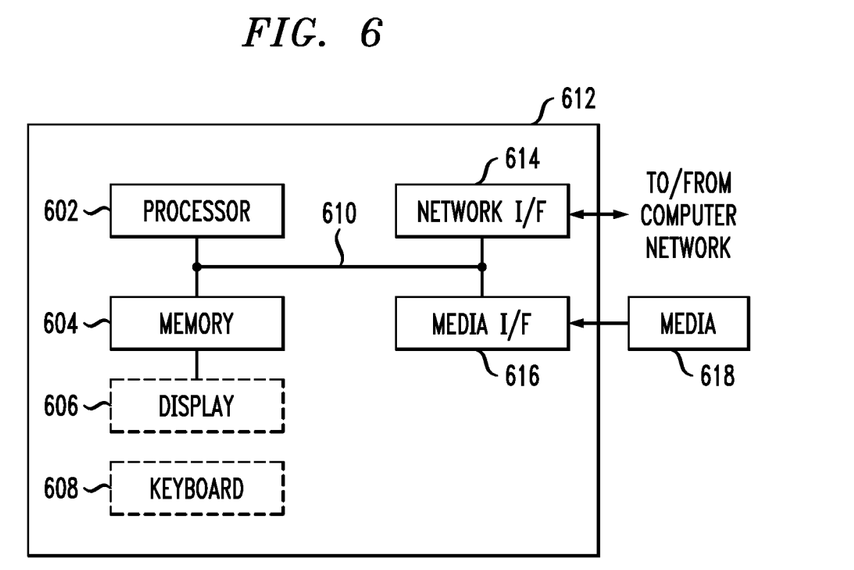
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, examining an entire software stack running on systems, the network layer, and the interaction among physical systems and virtual machines.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for mapping at least one physical system and at least one virtual system into at least two separate execution environments, comprising the steps of:
    discovering an implicitly enforced security policy in an environment comprising at least one physical system and at least one virtual system;
    using the discovered policy to create an enforceable isolation policy; and
    using the isolation policy to modify a deployment of one or more workloads in the at least one physical system and at least one virtual system to create at least two separate execution environments, wherein one or more steps of said method are performed by a processor.

2. The method of claim 1, wherein discovering an implicitly enforced security policy comprises processing at least one of one or more configuration files and system run-time information.

3. The method of claim 1, wherein using the discovered policy to create an enforceable isolation policy comprises creating a model of a workload network topology based on the discovered policy.

4. The method of claim 3, wherein the workload network topology model is used to partition at least one of one or more virtual machines and one or more physical systems into one or more groups working on a common workload.

5. The method of claim 1, wherein discovering an implicitly enforced security policy comprises:
    considering one or more services being offered on a system and usage of the one or more services; and
    determining a behavior pattern of a workload that is distributed on a set of at least one of one or more virtual machines and one or more physical systems.

6. The method of claim 1, further comprising providing feedback on a behavioral effect of a change in security policy.

7. The method of claim 1, wherein in using the discovered policy to create an enforceable isolation policy, the policy is synthesized via at least one of an analysis engine, and performing a best-fit analysis of known good policies with analogous behavior.

8. The method of claim 1, wherein the isolation policy comprises a white list, and wherein the white list explicitly defines all allowable accesses among one or more physical and virtual systems of an environment.

9. The method of claim 1, further comprising using a verification mechanism to enable a user to check if the discovered policy meets one or more expected security objectives.

10. The method of claim 1, further comprising enabling a user to refine the isolation policy to meet one or more desired security objectives.

11. The method of claim 1, wherein using the discovered policy to create an enforceable isolation policy comprises providing system configuration information and observation to a central site for analysis, and wherein the central site computes a current security policy.

12. The method of claim 1, further comprising using an isolated domain algorithm to identify and isolate one or more systems that serve one or more different workloads, determine a set of utilized services (US) on each system, construct a dependency graph G(V,E) using a US set, find one or more different domain lists using a depth first search (dfs), remove one or more vertices from a domain list that are not reachable during an execution from a starting vertex via use of an observed access pattern of one or more systems, and detect one or more shared vertices which are members of multiple domain lists.

13. The method of claim 12, wherein one or more services of the one or more shared vertices are examined to confine the multiple domain lists.

14. A method for generating a database of one or more isolation policies, comprising the steps of:
    discovering an implicitly enforced security policy in an environment comprising at least one physical system and at least one virtual system;
    using the discovered policy to create an enforceable isolation policy;

using the isolation policy to modify a deployment of one or more workloads in the at least one physical system and at least one virtual system to create at least two separate execution environments; and storing each isolation policy in a searchable database, wherein one or more steps of said method are performed by a processor.

15. A computer program product comprising a non-transitory computer readable recordable storage medium having computer readable program code for mapping at least one physical system and at least one virtual system into at least two separate execution environments, said computer program product including:

computer readable program code for discovering an implicitly enforced security policy in an environment comprising at least one physical system and at least one virtual system;

computer readable program code for using the discovered policy to create an enforceable isolation policy; and     computer readable program code for using the isolation policy to modify a deployment of one or more workloads in the at least one physical system and at least one virtual system to create at least two separate execution environments.

16. The computer program product of claim 15, wherein the computer readable code for using the discovered policy to create an enforceable isolation policy comprises creating a model of a workload network topology based on the discovered policy.

17. The computer program product of claim 15, wherein computer readable code for using the discovered policy to create an enforceable isolation policy comprises synthesizing the policy via at least one of an analysis engine, and performing a best-fit analysis of known good policies with analogous behavior.

18. The computer program product of claim 15, wherein the computer readable code for using the discovered policy to create an enforceable isolation policy comprises providing system configuration information and observation to a central site for analysis, and wherein the central site computes a current security policy.

19. The computer program product of claim 15, further comprising computer readable code for using an isolated domain algorithm to identify and isolate one or more systems that serve one or more different workloads, determine a set of utilized services (US) on each system, construct a dependency graph G(V,E) using a US set, find one or more different domain lists using a depth first search (dfs), remove one or more vertices from a domain list that are not reachable during an execution from a starting vertex via use of an observed access pattern of one or more systems, and detect one or more shared vertices which are members of multiple domain lists.

20. A computer program product comprising a non-transitory computer readable recordable storage medium having computer readable program code for generating a database of one or more isolation policies, said computer program product including:

computer readable program code for discovering an implicitly enforced security policy in an environment comprising at least one physical system and at least one virtual system;

computer readable program code for using the discovered policy to create an enforceable isolation policy;

computer readable program code for using the isolation policy to modify a deployment of one or more workloads in the at least one physical system and at least one virtual system to create at least two separate execution environments; and     computer readable program code for storing each isolation policy in a searchable database.

21. An apparatus for mapping at least one physical system and at least one virtual system into at least two separate execution environments, comprising:

a memory; and at least one processor coupled to said memory and operative to:

discover an implicitly enforced security policy in an environment comprising at least one physical system and at least one virtual system;

use the discovered policy to create an enforceable isolation policy; and         use the isolation policy to modify a deployment of one or more workloads in the at least one physical system and at least one virtual system to create at least two separate execution environments.

22. The apparatus of claim 21, wherein the at least one processor coupled to said memory and operative to use the discovered policy to create an enforceable isolation policy is further operative to create a model of a workload network topology based on the discovered policy.

23. The apparatus of claim 21, wherein the at least one processor coupled to said memory and operative to use the discovered policy to create an enforceable isolation policy is further operative to synthesize the policy via at least one of an analysis engine, and performing a best-fit analysis of known good policies with analogous behavior.

24. The apparatus of claim 21, wherein the at least one processor coupled to said memory and operative to use the discovered policy to create an enforceable isolation policy is further operative to provide system configuration information and observation to a central site for analysis, and wherein the central site computes a current security policy.

25. The apparatus of claim 21, further comprising at least one processor coupled to said memory operative to use an isolated domain algorithm to identify and isolate one or more systems that serve one or more different workloads, determine a set of utilized services (US) on each system, construct a dependency graph G(V,E) using a US set, find one or more different domain lists using a depth first search (dfs), remove one or more vertices from a domain list that are not reachable during an execution from a starting vertex via use of an observed access pattern of one or more systems, and detect one or more shared vertices which are members of multiple domain lists.

* * * * *